Nov. 21, 1950 W. S. CONNELL 2,531,323
REFRIGERATION CABINET
Filed July 26, 1946 2 Sheets-Sheet 1
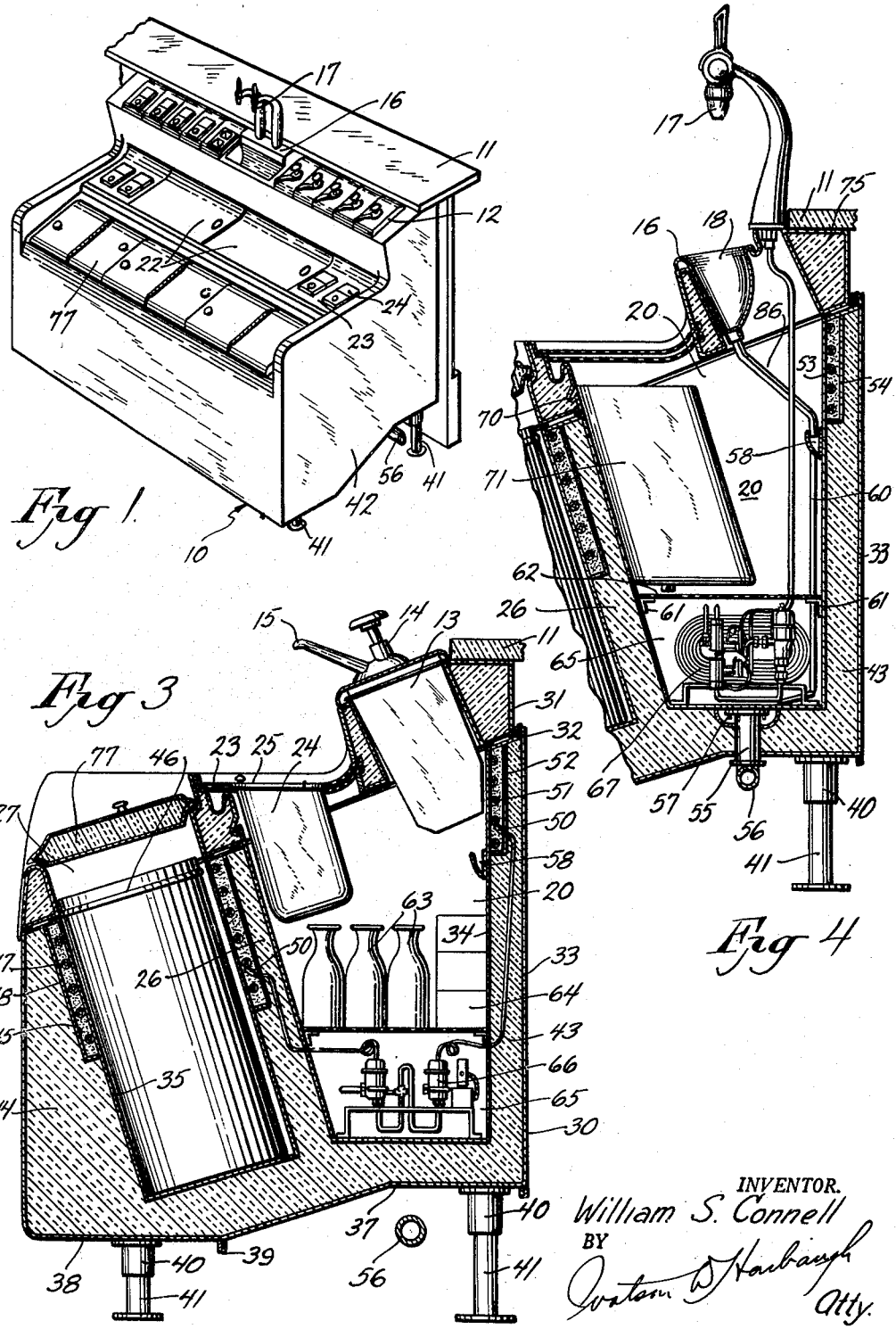
INVENTOR.
William S. Connell

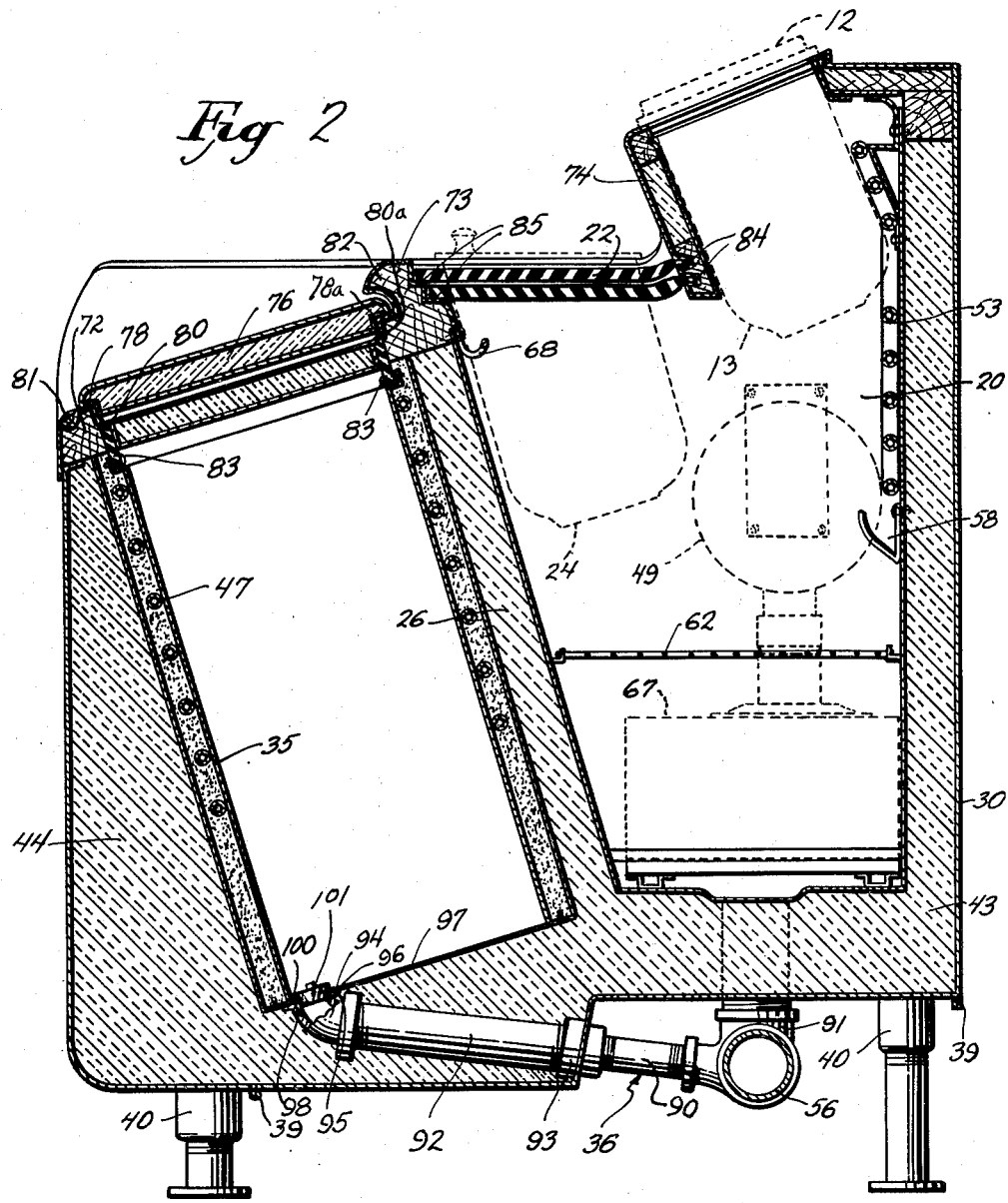

Patented Nov. 21, 1950

2,531,323

UNITED STATES PATENT OFFICE 2,531,323

REFRIGERATION CABINET

William S. Connell, Norwood Park Township, Cook County, Ill., assignor to The Bastian-Blessing Company, Chicago, Ill., a corporation of Illinois Application July 26, 1946, Serial No. 686,287

9 Claims. (Cl. 62—89)

The present invention relates generally to two-temperature refrigeration cabinets and more particularly to ice cream dispensing and soda fountains sometimes referred to commercially as creamer units.

Soda fountains are relied upon by users to refrigerate and store all edibles which might spoil without refrigeration, such as fruits, syrups of all flavors, milk, butter, cheese, etc., which are in addition to ice cream and water, both soda and sweet water, normally refrigerated by the soda fountain. Heretofore, the soda fountains have been badly cut up in their compartment design and construction. Access to all of these items has been difficult and very often those in front have to be removed to gain access to those located beneath or behind them.

Furthermore most fountains storing ice cream and other items have the ice cream compartment at one end, and the cold storage compartment for other items at the other end. This requires manufacturers to produce two different fountains, one a mirror image of the other because some installations will require the reverse of other installations, depending upon the rest of the installation and local architecture.

In the present invention a creamer unit or soda fountain is provided wherein all ice cream containers are readily available for immediate removal at the front, and, while in place, are located at a convenient angle for access along the front of the cabinet throughout its length. All the other jars and article storage spaces are located behind the rear insulated wall of the ice cream compartment so that the two compartments may be maintained at different temperatures and all of them be readily accessible.

Another feature of the invention resides in the uniformity of cross-sectional contour throughout the fountain length which makes of it a construction which is quite easy to manufacture and assemble. This also enables the manufacture of fountains of different lengths with little, if any, complications arising from design changes, and, permits of a single inventory item in each length.

Another object of the invention is to provide a structural arrangement in a fountain in which milk, fruit and other items are readily accessible at either end and throughout its length at any station where mixing operations either for beverages or parfaits are being performed.

The entire length of the pump rack is located over the cold storage compartment, which eliminates the need for any bottom, insulated or otherwise, since no portion of the pump rack is adjacent to the ice cream storage compartment of the cabinet to run the risk of freeze-ups.

Not only these, but from a sanitary viewpoint many additional objects are accomplished. The inclination of the ice cream compartment permits flushing and draining with large quantities of clean water, without need for mopping up any surplus; the food storage compartment is large and deep with removable sliding racks therein so that any spilling can be easily washed away; the covers for the ice cream compartment are inclined to drain off any water spilled on them rather than permit it to be collected in puddles and later dropped into the ice cream to form unsanitary and unwanted chunks of ice in the cream. All water handling apparatus is located in a drained, cool compartment readily accessible for servicing and adjustment; all expansion valves are located in the cold storage compartment rather than in a cavity within the insulation. When located in the storage compartment these valves may be adjusted and serviced without first removing an access panel. In most prior creamers access panels are generally in the front wall. In the present invention the front wall is one continuous expanse of sheet metal which is easy to keep clean and does not have cracks or crevices in which to catch dirt, and the arrangement provided permits extra height between floor and bottom of the cold storage compartment where the plumbing can be located and serviced quickly.

The invention is further characterized by certain novel constructions and arrangements of elements as hereinafter described, other and further objects being apparent from the drawings, the description relating thereto and the appended claims.

Referring to the drawings:

Fig. 1 is a perspective view of a soda fountain embodying the invention.

Fig. 2 is an enlarged transverse section of a cabinet illustrating a preferred embodiment of the invention.

Fig. 3 is a section similar to Fig. 2 illustrating another form of the invention.

Fig. 4 is a partial section through the cabinet shown in Fig. 1 at the draft arm station.

Referring now to the drawings in further detail, the cabinet 10 is illustrated in Fig. 1 as viewed from the workside thereof. A service bar 11 is provided upon the rear side thereof nearest the customer. In front of the service bar is located a syrup bank or rail 12 comprising jars 13 provided with pumps 14 to dispense the respective syrups through nozzles 15. In addition to the jars, there is also mounted in this rail a draft arm station 16 at which the draft arm nozzle 17 opens downwardly above a funnel type drain 18.

Below the jar rail there is a cold storage compartment 20 as more particularly shown in the other figures of the drawings and access to this storage compartment is had through overlapping sliding doors 22 located in front of the jar rail. The cold storage compartment extends the full length of the cabinet as well as the access opening, and the sliding doors can be located at any point desired. However, since it is not necessary to have sliding doors throughout the length of the cabinet for access to the cold storage compartment, slide supports 23 such as shown in Fig. 3 are provided to receive in supported relationship ladle jars 24 having hinged removable covers 25 thereon for storing any one of a number of different liquids such as crushed fruits, marshmallow topping, etc., which cannot be handled by pumps.

In front of the cold storage compartment and separated therefrom by an insulated wall 26 is an ice cream compartment 27 maintained at a temperature well below freezing to preserve the ice cream stored therein for dispensing in the proper condition.

The cabinet 10 can be made as a single unit as preferably shown in Fig. 2 or can be made of two assembled portions comprising a base portion 30 and a main top portion 31 severable therefrom along the line 32 as shown in Figs. 3 and 4. Both of these cabinets, however, are characterized by an outer shell 33 and two inner shells or liners 34 and 35 defining the cold storage compartment 20 and the ice cream compartment 27 respectively. The inner shell or liner 34 of the cold storage compartment is preferably of stainless steel, to resist the corrosion from moisture that condenses therein. The inner shell or liner 35 of ice cream compartment is preferably of steel with a protective zinc coating, since there is little corrosive action from condensation, due to the sub-freezing temperature maintained in this compartment. Furthermore the zinc coated steel is a material of good heat conductivity which is desirable since the refrigeration coils are preferably located on the outside of this liner.

The outer shell 30 of cabinet is preferably of zinc coated steel with portions exposed to view, faced with stainless steel or other material providing a sanitary surface of pleasing appearance.

In forming the outer shell 30 of the cabinet two or more metal sheets, running the full length of the cabinet, are formed to contour shown on Fig. 2 or 3. One sheet includes the front and a portion of the bottom, and the other or others include the rear and the remaining portion of the bottom, the two being welded together at the line of juncture along the bottom as at 39. Sheet metal end panels 42 (Fig. 1) are provided with flanged edges and are set with flanges outward. The shell 30 is marginally welded to flanges of end panels 42, thus forming a box with open top. The contour shown in Fig. 2 is provided to accommodate a drain connection 36 from the ice cream compartment. The bottom portion 37 of the shell which comes under the storage compartment is disposed at a higher level than the bottom portion 38 coming under the ice cream compartment so that plumbing connections to the cabinet can be located there where they are readily accessible for assembly or service.

Flanges 40 are fastened to the two respective levels to receive pipes 41 of appropriate length to support the fountain in plumb relationship.

Insulation 43, in the form of rigid preformed cork blocks, is then placed in the cabinet shell along the bottom, sides, and ends. The finished inside contour of insulation is shaped to receive the liners 34 and 35 and the refrigeration coils 47.

The insulation 44 at the front of the cabinet is thicker at the bottom than it is at the top so that its inner wall is inclined from the vertical at a degree of approximately 20° with a slight recess indicated at 45 beginning part way up from the bottom.

The ice cream compartment liner 35 is then slipped into place. This liner is made up of a metal sheet bent along two lines to form a rectangular section having long side walls with the bottom wide enough to take the largest commercial ice cream container such as that indicated at 46. Sheet metal ends are marginally welded to this liner. Along the upper portions of the side and end walls and preferably on the outside thereof are secured the coils of a refrigerant expansion conduit 47. Expansion conduit 47, and temperature responsive bulb 50 disposed proximate to same, are provided with tails of sufficient length for connections as hereinafter described.

The insulation in the wall 26 is then laid in place against the rear side of the ice cream compartment shell 35 and the storage compartment shell 34 is dropped into place. The tail pieces of coils 47 and temperature responsive bulb 50 are fed through an opening in the liner 34 as it is being lowered into place.

The storage compartment shell 34 is made in a manner similar to the ice cream compartment except that the rear side thereof is disposed parallel with the rear side 33 of the outer shell 30 while the front side of the ice cream compartment is disposed parallel with the rear side of the ice cream compartment shell. As thus provided the compartment is much wider at the top than it is at the bottom. Upon the back side of the storage compartment shell is located an expansion coil 51 which is mounted upon the outside of the shell as shown in Fig. 3. Tails on these coils extend through the liner 34 into the compartment. In event, however, the expansion coil is located inside the storage compartment as shown in Fig. 2, it is preferably installed after the liner is inserted in place.

From the description thus far it will be apparent that a cabinet is described which is easy to construct in its main assembled form and that the wedge-like shape of the storage compartment shell makes it easy to press it home and wedge all insulation elements properly and rigidly in place.

After liners 34 and 35 are in place, the space between insulation and liner in which the expansion coils 47 and 51 are located is filled solidly with a hot mastic substance poured in from the top, to prevent any frosting around coils and the increased contact with liners to aid in heat transmission.

As more particularly shown in Fig. 4, a drain 55 is provided as connected into a drain header 56. This drain is secured to an opening in the bottom of the shell 34 in sealed relationship by bolts 57, and throughout the length of the coil 53 a trough 58 is secured below the area of the coil 53 to collect and drain away any moisture that may condense upon the coil or the surface of the shell which is refrigerated by the coil. This trough has a single drain conduit 69 leading to a point proximate to the drain 57. Part way up the sides of the storage compartment are located brackets 61 extending the full length of the compartment to receive thereon a reticulated shelf 62 upon which articles such as milk bottles 63 and packages 64 may rest below the sliding doors 22. The shelf 62 is readily removable in sections so that access can be had to the space 66 below it in which space the expansion valves 66 for the coils may be located, also a water cooler 67 as more particularly shown in the Johnson application Serial No. 588,571, now Patent No. 2,500,694, issued March 14, 1950, reference to which is hereby made, and any other mechanical devices used in the operation of the cabinet. A wire rail 68 as shown in Fig. 2 or a groove 70 as shown in Fig. 4 may be provided upon the front side of the storage compartment 20 upon which things such as the chipped ice bucket shown at 71 can be hung at any given point throughout the length of the compartment where it is located under the sliding covers 22 at the draft arm station 16. To one side under the ladle jars 24 a carbonator 49 may be located, the structure and operation of which is more particularly described in Buttner et al. application Serial No. 513,523, now Patent No. 2,450,825 issued on October 5, 1948, reference to which is hereby made.

Closing the top of the front and intermediate walls 29 and providing a dividing rail longitudinally over the top of the compartment 20 are metal clad beams or rails 72, 73 and 74 respectively. As shown in Fig. 2 the top of the rear wall is merely flushed to receive the service bar 11 thereon whereas in Figs. 3 and 4 a metal clad rail 75 is provided for that purpose. In Fig. 2 the rails 72, 73 and 74 are installed and soldered at their ends to the end walls after the inner shells have been located in place. In this embodiment the covers for the ice cream compartment are sliding covers 76 instead of hinged flip-flop covers 77 as shown in Fig. 3 and the rails 72 and 73 are constructed to accommodate them. The rail 72 is provided with a top slide track at 78 and a lower slide track 80 upon its rear surface while the inner face of the rail 73 is correspondingly formed to provide the tracks 78a and 80a. These tracks are preferably located square with the sides of the ice cream compartment and for that reason their top surface is inclined from the horizontal at approximately a 20° angle. This angle will drain off any water thereon to the front rail 72 where a grooved portion 81 serves as a catch to prevent water from flowing down the front of the cabinet. This catch 81 can be wiped out upon occasion when any substantial amount of water collects there due to condensation around the opening on humid days or water spilled from above it. Any water which is spilled upon the lower of the slide doors 76 will drain down the inside of the ice cream compartment along the front wall thereof without any danger of its dripping into the cans. This water, of course, will ultimately freeze in the compartment until such time the compartment receives its periodic cleaning and flushing at which time it will drain out through the drain 33.

The rail 73 is conformed at its upper and forward edge to provide an edge 82 which overhangs the tops of the sliding doors 76 so that any water which will be splashed over the top of the rail 73 will drop upon the top of the door 76 and will drain from there to the catch 81 without dripping through into the cans below the doors at their upper edge. The convolution made upon the catch 81 and the overhang 82 upon the rail 73 are decorative as well as utilitarian.

Between the inner edges of the metal of the rails 72 and 73 and the upper metal edges of the ice cream compartment shell 35 temperature breaker strips 83 are fastened in an overlapping relationship of such an arrangement as shown that any water flowing from the rails into the compartment will be directed to the bottom of the compartment rather than permitted to seep into the insulation 26. At the bottom edge of the rail 74 two horizontally disposed parallel grooves are located which serve as slideways for the rear edge of the slide doors 22 and any supports such as 23 which are used to mount crushed fruit jars in the storage compartment 20.

At the rear edge of the rail 73, step slideways 85 are provided at the front of the slide doors 22 or jar supports 23 to hold same. Here again any water spilled upon the slide doors 22 will flow forwardly due to the curved contour of their upper face, pass over the stepped slideways 85 and flow down the inclined front wall of the storage compartment without any danger of contaminating any food stuffs stored therein.

The top of the rail 74 is spaced from the top of the back wall 43 of the cabinet and so arranged at an angle with respect to each other that jars 17 are retained therein by gravity. The draft arm station 16 is preferably secured in place by screws in a suitable manner. The draft arm station is preferably made up of a sheet metal stamping having a funnel drain 18 therein of irregular internal contour so that glasses and other items cannot be set on the cabinet at the draft arm station where they might be upset by others using the draft arm. This funnel below the draft arm drains through a pipe to the trough 58 which in turn is open throughout its length for access in cleaning and is contoured along the front wall thereof so that any overflow will flow down the front wall of the trough 58 into contact with the rear wall of the storage compartment without any danger of contaminating food stuffs stored in the storage compartment. With this arrangement in the jar rail, two or more soda draft arm stations may be provided at different points along the jar rail if desired by merely removing several of the jars 12 and mounting and connecting the second draft arm station.

Otherwise the only substantial difference between the embodiment shown and described in connection with Fig. 2 and the embodiments shown in Figs. 3 and 4, is that the rails 72, 73, 74 and 75 are made as a separate unit in Figs. 3 and 4, to be dropped in place after their assemblage instead of being assembled directly and integrally with the base of the cabinet. Of course, if flip-flop covers such as shown at 77 are employed over the ice cream compartment the overhang 82 cannot be used.

Referring again to Fig. 2 the preferred construction of a drain from the ice cream compartment is shown in which a nipple 90 threaded into a T fitting 91 in the main drain 56 and a shouldered adaptor 93 is threaded to the nipple 90 from the inside of the cabinet before the insulation is installed. A plastic connector 92 connects the adaptor 93 and a 45° elbow recessed as at 95 to accommodate an offset 96 in the bottom wall 97 of the ice cream compartment shell 35 and internally threaded as at 98 to receive a gland nut 100 to clamp the offset 95 in sealed relationship with or without a washer as desired. The gland nut is conformed at its opening to accommodate a rubber stop 101 so that the rubber is a flexing agent which would break away from any ice formation collecting when it becomes desirable to flush out the ice cream compartment. The gland nut 100, of course, is threaded into place after the insulation and the ice cream compartment shells are located in place. The non-conductivity of the plastic connector 92 prevents any appreciable loss of refrigeration through to the drain pipe 56.

Having thus described certain constructions embodying the invention, it will be readily apparent to those skilled in the art how various and further modifications and changes can be made which also accomplish the objects and conception of the invention without departing from the spirit therein whose scope is commensurate with the appended claims.

What is claimed is:

1. In an elongated ice cream cabinet having insulated bottom and side walls defining a refrigeration space, a partition extending longitudinally the length of the cabinet to separate said space into a front compartment and a rear compartment as determined from the work side of the cabinet, means for supporting a plurality of doors for closing the top of said front compartment, and means for supporting a second plurality of doors of said rear compartment, the top of said partition extending over said first mentioned doors and said first mentioned doors being inclined downwardly towards the front of said compartment.

2. In an elongated ice cream dispenser cabinet having an insulated bottom and side walls defining a refrigeration space, the combination including a partition extending longitudinally the length of the cabinet to separate said space into two compartments, the top of one of said compartments being lower than the other, a plurality of removable insulated covers for closing the top of the lower compartment, means for supporting said covers at a slight angle with the horizontal, a projecting portion on said partition overhanging the upper edges of the covers of the lower of said compartments and said covers sloping downwardly away from said partition.

3. In an elongated ice cream dispenser cabinet having insulated bottom and side walls defining refrigeration space, the combination including a partition extending longitudinally the length of the cabinet to separate said space into a front compartment and a rear compartment as determined from the work side of the cabinet, said compartments being of substantially uniform section throughout their length, means for refrigerating the air in said compartments to maintain them at different temperatures, a plurality of insulated covers for closing the top of said front compartment, additional cover means for providing access through the top of said rear compartment, and means separate from the cover means for supporting containers of syrup and foodstuffs in the top of said rear compartment.

4. In an elongated ice cream dispenser cabinet having insulated bottom and side walls defining a refrigeration space, the combination including a partition extending longitudinally the length of the cabinet to separate it into a front storage compartment and a rear storage compartment, a plurality of access covers for closing the top of said front compartment, cover supporting means for supporting the rear edge of said covers, means for supporting a plurality of syrup jars at the rear of said rear compartment, and a second plurality of access covers disposed in front of said syrup jars and permitting access to the rear storage compartment, the front edges of said second plurality of covers being supported on said cover supporting means, and the cover supporting means having a projection overhanging the rear edges of the first mentioned covers.

5. A combination soda fountain and ice cream dispenser unit comprising an insulated cabinet, partition means dividing said cabinet into a front space for storage of ice cream and a rear space for the storage of food stuffs, each of said spaces having access doors opening into the top thereof, said rear space also having an opening in the top wall thereof to the rear of the access doors, a plurality of containers for syrups depending from said opening so that a major portion of each container is disposed within said rear space, and means for refrigerating said spaces, said means being adapted to cool the front space to a lower temperature than the rear space.

6. A combination soda fountain and ice cream dispenser unit comprising an elongated insulated cabinet defining a refrigeration space, a longitudinal partition extending the length of the cabinet dividing said space into a front compartment for the storage of ice cream and a rear compartment for the storage of food stuffs, said rear compartment being substantially the same height as said first mentioned compartment and having a plurality of openings in the top wall thereof, a plurality of containers for syrups depending from some of said openings so that a major portion of each container is disposed within said rear compartment, and access covers closing the other of said plurality of openings, said covers providing access to the space below said containers.

7. In an elongated ice cream dispenser cabinet having insulated bottom and side walls defining refrigeration space, the combination including a partition extending longitudinally the length of the cabinet to separate said space into a front compartment and a rear compartment as determined from the work side of the cabinet, said compartments having access openings in the tops thereof, doors for each of said compartments closing the access openings, and means supporting a plurality of removable receptacles in the top of said cabinet behind the doors to said rear compartment, said containers extending downwardly into the rear compartment.

8. In an elongated ice cream dispenser cabinet having insulating bottom and side walls defining refrigeration space, the combination including a partition extending longitudinally the length of the cabinet to separate said space into a front compartment and a rear compartment as determined from the work side of the cabinet, said compartments having access openings in the top thereof and said partition being inclined frontwardly from the vertical, and closure members for the access openings, the closure members of said rear compartment being disposed at the front edge thereof over said inclined partition, and means supporting a plurality of receptacles in the top of said cabinet to the rear of the last mentioned closure members with the receptacles depending into said rear compartment.

9. In an enlongated ice cream dispenser cabinet having insulated bottom and side walls defining refrigerator space, the combination including a longitudinally extending partition to separate said space into a front compartment and a rear compartment as determined from the work side of the cabinet, means for refrigerating the air in said compartments to maintain them at different temperatures, a plurality of covers for closing the top of said front compartment, additional cover means for providing access through the top of said rear compartment, and means separate from the cover means for supporting containers of syrup in the top of said rear compartment with the containers depending into said rear compartment in heat exchange relation with the cool air therein.

WILLIAM S. CONNELL.

REFERENCES CITED

The following references are of record in the file of this patent:

UNITED STATES PATENTS

| Number | Name | Date |
|---|---|---|
| Re. 18,795 | Hunt | Apr. 11, 1933 |
| 721,860 | Carr | Mar. 3, 1903 |
| 1,161,536 | Sebring | Nov. 23, 1915 |
| 1,394,130 | Wiechert | Oct. 18, 1921 |
| 1,467,246 | Hilger | Sept. 4, 1923 |
| 1,835,785 | Kellog | Dec. 8, 1931 |
| 1,950,282 | Whitley | Mar. 6, 1934 |
| 2,026,838 | Koepke | Jan. 7, 1936 |
| 2,068,131 | Kenney | Jan. 19, 1937 |
| 2,140,810 | Ohlhaver | Dec. 20, 1938 |
| 2,238,511 | Thaxter | Apr. 15, 1941 |
| 2,356,068 | Larsson | Aug. 15, 1944 |